United States Patent
Nold et al.

(10) Patent No.: US 7,027,691 B1
(45) Date of Patent: Apr. 11, 2006

(54) LIGHT COUPLING AND DISTRIBUTION SYSTEM

(75) Inventors: Jeffrey Paul Nold, Livonia, MI (US);
David Allen ONeil, Radnor, PA (US);
Timothy Fohl, Carlisle, MA (US);
Tomonari Ishikawa, Saitama (JP)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/410,952

(22) Filed: Oct. 5, 1999

(51) Int. Cl.
*G02B 6/00* (2006.01)
*G02B 6/26* (2006.01)

(52) U.S. Cl. .................. 385/43; 385/147; 362/551

(58) Field of Classification Search ............ 385/27, 385/31, 33, 39, 40, 41, 147; 395/900, 901; 362/551, 553, 554
See application file for complete search history.

(56) References Cited

U.S. PATENT DOCUMENTS

| | | | |
|---|---|---|---|
| 4,389,085 A * | 6/1983 | Mori | 359/591 |
| 4,496,211 A | 1/1985 | Daniel | |
| 5,081,639 A | 1/1992 | Snyder et al. | |
| 5,155,631 A | 10/1992 | Snyder et al. | |
| 5,181,229 A | 1/1993 | Langlais et al. | |
| 5,258,989 A | 11/1993 | Raven | |
| 5,281,301 A * | 1/1994 | Basavanhally | 216/24 |
| 5,319,528 A | 6/1994 | Raven | |
| 5,463,534 A | 10/1995 | Raven | |
| 5,589,684 A | 12/1996 | Ventrudo et al. | |
| 5,633,967 A * | 5/1997 | Haruta | 385/50 |
| 5,844,723 A | 12/1998 | Snyder | |
| 6,034,779 A * | 3/2000 | Yamaura | 356/614 |
| 6,152,588 A * | 11/2000 | Scifres | 362/496 |
| 6,587,618 B1 * | 7/2003 | Raguin et al. | 385/33 |
| 6,625,350 B1 * | 9/2003 | Kikuchi et al. | 385/33 |

FOREIGN PATENT DOCUMENTS

| | | |
|---|---|---|
| DE | 195 42 416 | 5/1996 |
| EP | 0 596 865 | 5/1994 |
| WO | WO 98/02690 | 1/1998 |
| WO | WO 98/33007 | 7/1998 |
| WO | WO 00/36336 | 6/2000 |

* cited by examiner

*Primary Examiner*—Akm Enayet Ullah
(74) *Attorney, Agent, or Firm*—Kevin G. Mierzwa

(57) ABSTRACT

A light coupling and distribution system includes a plurality of light sources are used to generate light. The lighting system further has an optical fiber and a light coupler optically coupling the light sources to the fiber. The light coupler has a body and a plurality of lenslets corresponding to a respective light source. Each lenslet directs light through the body to the optical fiber.

16 Claims, 2 Drawing Sheets

LIGHT COUPLING AND DISTRIBUTION SYSTEM

TECHNICAL FIELD

The present invention relates generally to a light coupling system, and more particularly, to a light coupling device for coupling light into a optical fiber.

BACKGROUND

Conventional light transmission systems used within automotive vehicles use a bulb and reflector system. In a bulb and reflector system, a filament of the bulb is placed at or near a focal point of the reflector. Typically, in an automotive application, a conventional bulb and reflector system collects and reflects only about thirty percent of the light emitted from the bulb filament.

Bulb and reflector systems have several disadvantages including aerodynamic and aesthetic styling which is limited by the depth of the reflector. For interior applications, scarce package space is used by the depth of the lighting package. Additionally, thermal energy given off by the bulb during operation must be considered in the development of the components. This is particularly true for lighting systems within an automotive vehicle such as instrument panel lights.

Fiber optic systems for light distribution have been explored by automotive manufacturers. Such systems have the advantage of locating the light source in a central location and distributing light through fiber optics to their desired location. To provide illumination for such systems, laser diodes have been proposed. Laser diodes are formed on a large wafer in rows. The rows are referred to as bars. To direct light into a single larger fiber, an array of fibers are typically used. The array of fibers are butt coupled to the individual diode cavities of the wafer. The individual fibers are then coupled together to feed a single larger fiber.

Providing a number of fibers butt coupled to the array of diodes, however, is very inefficient and is labor intensive to assemble.

Thus, there is a need in the art for an efficient light collector that is also easy to assemble.

SUMMARY OF THE INVENTION

The present invention is unique and efficient in light collection particularly for use in vehicle lighting.

In one aspect of the invention, a plurality of light sources are used to generate light. The lighting system further has an optical fiber and a light coupler optically coupling the light sources to the fiber. The light coupler has a body and a plurality of lenslets corresponding to a respective light source. Each lenslet directs light through the body to the optical fiber.

In a further aspect of the invention, the lenslets have a wedge-shaped cross section in the horizontal direction and a circular cross section in the vertical cross section. Thus, light is collimated in the body in the vertical direction and directed toward the optical fiber in the horizontal direction.

One advantage of the invention is that the monolithic structure allows the light distribution system to easily be assembled.

Other objects and features of the present invention will become apparent when viewed in light of the detailed description of the preferred embodiment when taken in conjunction with the attached drawings and appended claims.

DESCRIPTION OF THE PREFERRED EMBODIMENT

Figure 1:
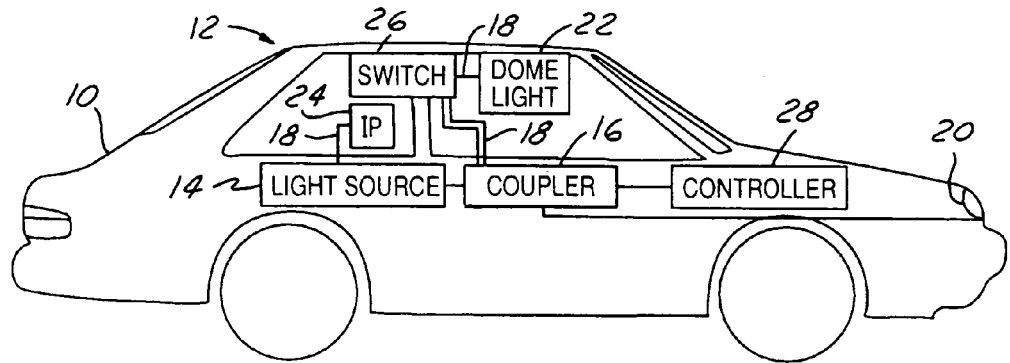
FIG. 1 is a side cutaway view of an automotive vehicle having a light distribution system according to the present invention.

In the following figures the same reference numerals are used to identify identical components in the various figures. Although the present invention is described with respect to a light distribution system for an automotive vehicle, the present invention may be applied to other non-automotive applications such as housing and consumer electronics. Other examples of specific uses of the lighting system of the present invention include pumping other lasers and metal working.

Referring now to FIG. 1, an automotive vehicle 10 has a lighting system 12. Lighting system 12 has a light source 14 and a coupler 16. Light source 14 and coupler 16 are coupled to optical fibers that are used to distribute light to portions of automotive vehicle 10. Various types of suitable optical fibers are well known to those in the art.

Light source 14 and coupler 16 may be used to provide a source of light to headlights 20, to a dome light 22, and/or to an instrument panel 24. These components are merely illustrative of potential applications of the present invention. A switch 26 is illustrated coupled to dome light 22. Switch 26 is used to control the flow of light to dome light 22. Although a single switch 26 is illustrated, switches may also be used to control light to instrument panel 24 and headlights 20.

A controller 28 may also be coupled to light source 14 and coupler 16. Controller 28 is microprocessor-based and may be used to control the amount of light from light source 14 or the application of power from a power source to light source 14. Applications in which a controller may be employed include the control of turn signals, headlights and selectively controlling back lighting of instrument panels and radios.

Figure 2:
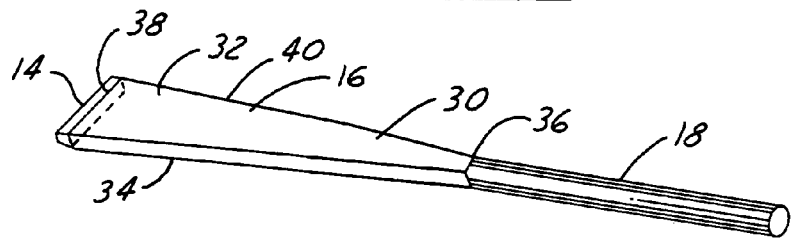
FIG. 2 is a perspective view of a light coupler according to the present invention coupled to an optical fiber.

Referring now to FIG. 2, a perspective view of light source 14 coupled to a coupler 16 is illustrated. Coupler 16 coupled to an optical fiber 18 is illustrated. Coupler 16 has a coupler body 30 having an upper surface 32, a lower surface 34, an output end 36, and an input end 38. Light source 14 is coupled to input end 38. Optical fiber 18 is coupled to output end 36. Coupler body 30 also has angular side surfaces 40, 42 that help direct light to output end 36 as described below. That is, the input end 38 is longer than the output end 36 with the angled side surfaces 40, 42, therebetween. Side surface 40, 42 have an angle 54 with respect to the axis to the optical fiber of about 8°.

Figure 3:
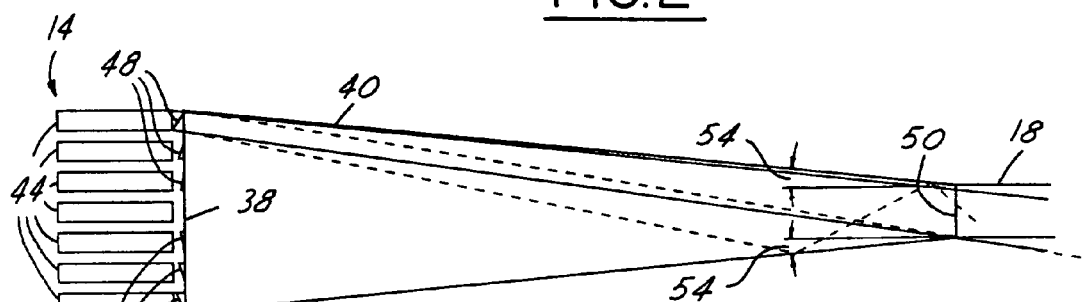
FIG. 3 is a top view of the light coupler FIG. 3.
Figure 4:
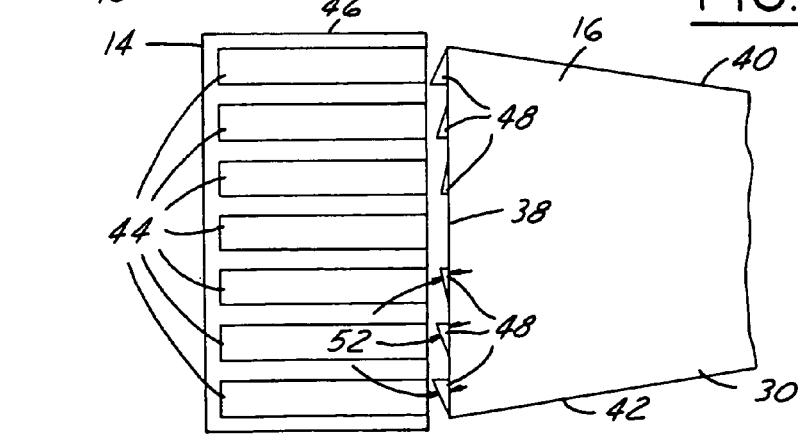
FIG. 4 is an enlarged partial view of light sources and coupler.

Referring now to FIGS. 3 and 4, light source 14 is comprised of a plurality of light emitters 44. In the present example, seven light emitters 44 are illustrated. Light emitters are used to direct light to input end 38 of coupler body 30. Light emitters 44 are preferably laser diodes. The diodes may be arranged in a row and fabricated on a single wafer 46. Of course, discrete emitters may also be used.

Each light emitter 44 has a respective lenslet 48 through which light is coupled into coupler body 30. Lenslets 48 are preferably integrally formed with body 30. Lenslets 48 redirect light emitted by light emitters 44 toward face 50 of optical fiber 18.

The center light emitter 44 is positioned directly opposite (normal to) optical fiber 18 and thus no lenslet is required. As the distance from the center emitter 44 increases, the angle 52 of lenslet with respect to input end 38 increases. For example, the first lenslet has an angle of about 24°, the second has an angle of about 15°, and the third lenslet 48 has an angle of about 4°. Of course, these angles may vary depending on the particular geometry of the overall system.

The sizing of optical coupler 16 follows. The light emitters 44 extend for a predetermined length upon the wafer 46. The input end 38 is sized to extend substantially the length of the emitters. Angle 54 and angle 52 are chosen to direct light by total internal reflection to optical fiber 18. It is preferred that most of light from emitters 14 is coupled into optical fiber 18, either directly or through reflection from side surfaces 40, 42.

Figure 5:
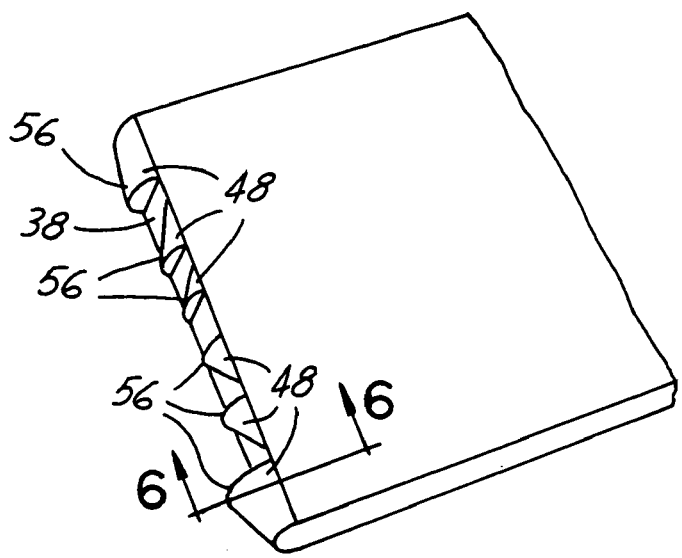
FIG. 5 is a perspective view of the lenslets of the light coupler.

Referring now to FIG. 5, a perspective view of input end 38 is illustrated. As shown above in a horizontal cross section, lenslets 48 are wedge-shaped. However, light emitted from light emitters 44 may diverge in a vertical angle by up to a 45° half angle. Such divergence is characteristic with commonly known laser diodes. Thus, providing merely a wedge-shaped lenslet 48 may not allow all the light to be coupled within coupler body 30. Lenslets 48 have a curved surface 56 that collimates light in the vertical direction. Also, lenslets 48 may be curved slightly in the horizontal direction to collimate light in the horizontal direction as well. The curvature will vary based upon the position of the lenslet and the light source as would be known to those skilled in the art.

Figure 6:
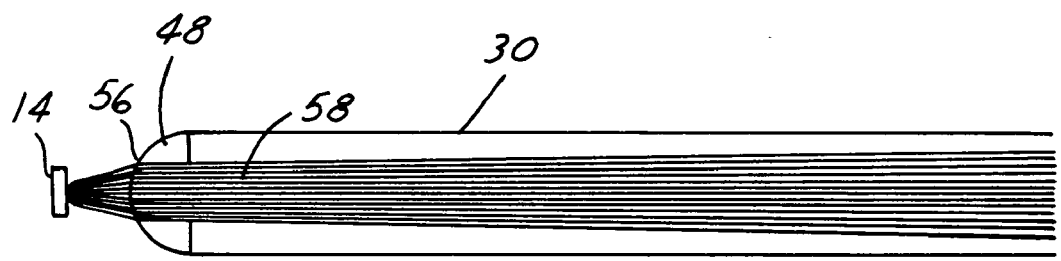
FIG. 6 is a cross-sectional view of a lenslet of FIG. 5.

Referring now to FIG. 6, a cross-sectional view through line 5—5 illustrates a lenslet 48 with light rays 58 that are emitted from emitter 14 substantially collimated in coupler body 30.

In operation, the number of emitters 44 and therefore the width of coupler body 30 may be adjusted depending on the particular intensity required for the particular application. As one skilled in the art would recognize, the angle of light directed to the surface of optical fiber should not exceed the numerical aperture of the fiber. If varying intensities are required, the controller may be used to selectively operate certain emitters. As the width is adjusted the angles of the lenslets are also adjusted to direct light to the face 50 of optical fiber 18. In a motor vehicle several couplers 30 and several light sources 14 may be employed. All the light sources and couplers may be maintained in a central location and a plurality of optical fibers 18 may be routed throughout the vehicle where light is desired.

While particular embodiments of the invention have been shown and described, numerous variations and alternate embodiments will occur to those skilled in the art. Accordingly, it is intended that the invention be limited only in terms of the appended claims.

What is claimed is:

1. A lighting system comprising:
    a plurality of light sources each generating light;
    an optical fiber; and
    a light coupler optically coupling light from said light sources into said optical fiber, said coupler having a monolithic body having an in put end having a first length with a plurality of lenslets formed therein and an output end having a second length less than the first length and a plurality of angular side surfaces coupling the input end and the output end, each lenslet corresponding to a respective light source, each lenslet directing light through the monolithic body to said output end and into said optical fiber.

2. A lighting system as recited in claim 1 wherein said body has sides with a predetermined angle with respect to a face of said optical fiber.

3. A lighting system as recited in claim 1 wherein the light sources comprise laser diodes.

4. A lighting system as recited in claim 1 wherein the light sources comprise a wafer having a plurality of laser cavities.

5. A lighting system as recited in claim 1 wherein each of said plurality of lenslets have a wedge shape.

6. A lighting system as recited in claim 5 wherein said wedge shape has an angle directing light to a face of said optical fiber.

7. A lighting system as recited in claim 6 wherein said angle increases as a distance from a center emitter increases.

8. A lighting system as recited in claim 1 wherein said plurality of lenslets collimated light in a first direction.

9. A lighting system as recited in claim 1 wherein said plurality of lenslets have a curved cross section.

10. A coupler for coupling light from a plurality of light emitters to an optical fiber comprising:
    a monolithic body structure body having an input and having a first length having a plurality of lenslets formed therein corresponding to a respective light emitter and an output end having a second length less than the first length and a plurality of angular side surfaces coupling the input end and the output end, each lenslet directing light through the body toward said output end and into said optical fiber.

11. A coupler as recited in claim 10 wherein said body has sides with a predetermined angle with respect to a face of said optical fiber.

12. A coupler as recited in claim 11 wherein said predetermined angle allows substantially total internal reflection of said light within said body.

13. A coupler as recited in claim 10 wherein each of said lenslets have a wedge shape.

14. A coupler as recited in claim 13 said wedge shape has an angle directing light to a face of said optical fiber.

15. A coupler as recited in claim 14 wherein said angle increases as a distance from a center emitter increases.

16. A coupler as recited in claim 10 wherein each of said plurality of lenslets collimates light in a first direction.

* * * * *

UNITED STATES PATENT AND TRADEMARK OFFICE
CERTIFICATE OF CORRECTION

| | | |
|---|---|---|
| PATENT NO. | : 7,027,691 B1 | Page 1 of 1 |
| APPLICATION NO. | : 09/410952 | |
| DATED | : April 11, 2006 | |
| INVENTOR(S) | : Jeffrey Paul Nold et al. | |

It is certified that error appears in the above-identified patent and that said Letters Patent is hereby corrected as shown below:

Column 4,
Line 38, should read as follows: -- a monolothic body structure body having an input end --

Signed and Sealed this

First Day of August, 2006

JON W. DUDAS
*Director of the United States Patent and Trademark Office*